United States Patent
Socha et al.

(10) Patent No.: US 10,451,446 B2
(45) Date of Patent: Oct. 22, 2019

(54) SYSTEM FOR INTERFACING WITH AN OPTICALLY-POWERED SENSOR

(71) Applicant: Rosemount Aerospace Inc., Burnsville, MN (US)

(72) Inventors: David Michael Socha, Champlin, MN (US); Mark Ray, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 143 days.

(21) Appl. No.: 15/875,770

(22) Filed: Jan. 19, 2018

(65) Prior Publication Data
US 2019/0226881 A1  Jul. 25, 2019

(51) Int. Cl.
| | |
|---|---|
| G01D 5/00 | (2006.01) |
| G01D 5/26 | (2006.01) |
| G02B 6/38 | (2006.01) |
| G01F 23/292 | (2006.01) |
| G02B 6/255 | (2006.01) |
| H04B 10/079 | (2013.01) |
| H04B 10/80 | (2013.01) |

(52) U.S. Cl.
CPC ........... *G01D 5/268* (2013.01); *G01F 23/292* (2013.01); *G02B 6/2552* (2013.01); *G02B 6/3851* (2013.01); *H04B 10/07955* (2013.01); *H04B 10/807* (2013.01)

(58) Field of Classification Search
CPC .................. G01D 5/268; G02B 6/3851; H04B 10/07955; H04B 10/807
USPC .......................... 250/227.14, 227.16, 227.24
See application file for complete search history.

(56) References Cited

U.S. PATENT DOCUMENTS

| | | | |
|---|---|---|---|
| 4,963,729 A | * | 10/1990 | Spillman .................. G01D 5/12 250/227.21 |
| 7,184,672 B2 | | 2/2007 | Forbes et al. |
| 7,192,195 B2 | | 3/2007 | Turner |
| 9,791,347 B2 | | 10/2017 | Guimond |
| 2014/0166852 A1 | | 6/2014 | Hauzeray |

(Continued)

FOREIGN PATENT DOCUMENTS

| | | |
|---|---|---|
| EP | 3220175 A1 | 9/2017 |
| GB | 2550401 A | 11/2017 |

OTHER PUBLICATIONS

Extended European Search Report dated Jul. 1, 2019, received for corresponding European Application No. 19151713.5.

*Primary Examiner* — Kevin K Pyo
(74) *Attorney, Agent, or Firm* — Kinney & Lange, P.A.

(57) ABSTRACT

Apparatus and associated methods relate to a system for interfacing with an optically-powered sensor. The system includes an optical emitter configured to emit a beam of optical energy so as to provide operating power for the optically-powered sensor. The system includes an optical detector configured to detect a time sequence of optical pulses generated by the optically-powered sensor, the time sequence of pulses modulated between first and second optical power levels. The system includes a parameter extractor configured to determine a value of a sensed parameter based on the time sequence of optical pulses detected by the optical detector. The system also includes a power controller configured to control power level of the emitted beam of optical energy based on the first and/or second optical power levels detected by the optical detector.

20 Claims, 4 Drawing Sheets

(56) References Cited

U.S. PATENT DOCUMENTS

2014/0331763 A1\* 11/2014 Robb .................... G01F 23/266
2017/0176235 A1 6/2017 Crowne \* cited by examiner

SYSTEM FOR INTERFACING WITH AN OPTICALLY-POWERED SENSOR

BACKGROUND

Metal wires have long been used to provide electrical communication between remote electrical systems. For example, remote sensors can communicate with sensor interface systems via metal wires. Aircraft, for example, have many such sensors and sensor interface systems, which have communicated with one another over metal wires. Such systems in the past have been shielded by the wings and fuselages, which had been constructed from metals, such as, for example aluminum. The fuselages, and/or wings of some aircraft are now being constructed using materials that are not conductive, such as, for example carbon composite materials. One consequence of using such construction materials is that electrical wires no longer are shielded by such materials.

For such wing constructions, lightning strikes can deleteriously interact with un-shielded electrically-wired systems. Wires for power or data transmission can induce an electrical discharge which can have undesirable consequences, especially in locations where such discharges can ignite a flammable liquid, such as aircraft stored in fuel tanks. Aircraft designers have begun replacing some electrical communications with optical communications. Thus, metal wires have been replaced by optical fibers. Optical communications still present potential problems. For example, the optical energy still must be controlled, because intense optical energy can still present ignition sources to flammable materials. Such dangerous conditions can arise, for example, if an optical fiber is severed within a fuel tank.

Thus, there is a need to control the energy of the optical signals guided by optical fibers.

SUMMARY

Apparatus and associated methods relate to a system for interfacing with an optically-powered fuel-level sensor. The system includes an optical emitter configured to emit a beam of optical energy so as to provide operating power for the optically-powered fuel-level sensor. The system includes an optical detector configured to detect a time sequence of optical pulses modulated between first and second optical power levels. The system includes a parameter extractor configured to determine a value of a sensed parameter based on the time sequence of optical pulses detected by the optical detector. The system also includes a power controller configured to control power level of the emitted beam of optical energy based on the first and/or second optical power levels detected by the optical detector.

Some embodiments relate to a method interfacing with an optically-powered fuel-level sensor. The method includes emitting, by an optical emitter, a beam of optical energy so as to provide operating power for the optically-powered fuel-level sensor. Then a time sequence of optical pulses, which have been modulated between first and second optical power levels, is detected by an optical detector. Then, a value of a sensed parameter is determined, based on the time sequence of optical pulses detected by the optical detector, by a parameter extractor. Then, power level of the emitted beam of optical energy is controlled, based on the first and/or second optical power levels detected by the optical detector, by a power controller.

DETAILED DESCRIPTION

Apparatus and associated methods relate to a sensor interface system configured to generate and control power of a beam of optical energy configured to provide operating power for a remotely-located optically-powered sensor. Power of the beam of optical energy is controlled based on a portion of the beam reflected by an optical feedthrough, which is located at a mechanical barrier and configured to provide optical communication therethrough. The reflected portion of the beam of optical energy is detected by the sensor interface system and the magnitude of the detected portion is indicative of a power level of the beam of optical energy that is communicated through the mechanical barrier.

In some embodiments, the sensor interface system configured to provide power to and receive signals from an optically-powered fuel-level sensor located in a sealed fluid container. The sensor interface system and the optically-powered fuel-level sensor are in optical communication with one another via two optical fibers. A beam of optical energy is provided by the sensor interface system to the optically-powered fuel-level sensor via a first optical fiber. The beam of optical energy is received by the optically-powered fuel-level sensor and converted to electrical operating power by the optically-powered fuel-level sensor. An optical signal indicative of a sensed parameter is provided by the optically-powered fuel-level sensor to the sensor interface system via a second optical fiber. An optical feedthrough is located at a wall of the sealed container to provide optical communication therethrough while maintaining a fluid seal. The optical feedthrough reflects a portion of the beam of optical energy back into the second optical fiber. The sensor interface system detects the reflected portion of the beam of optical energy and controls power level of the beam of optical energy based on the detected portion.

Figure 1:
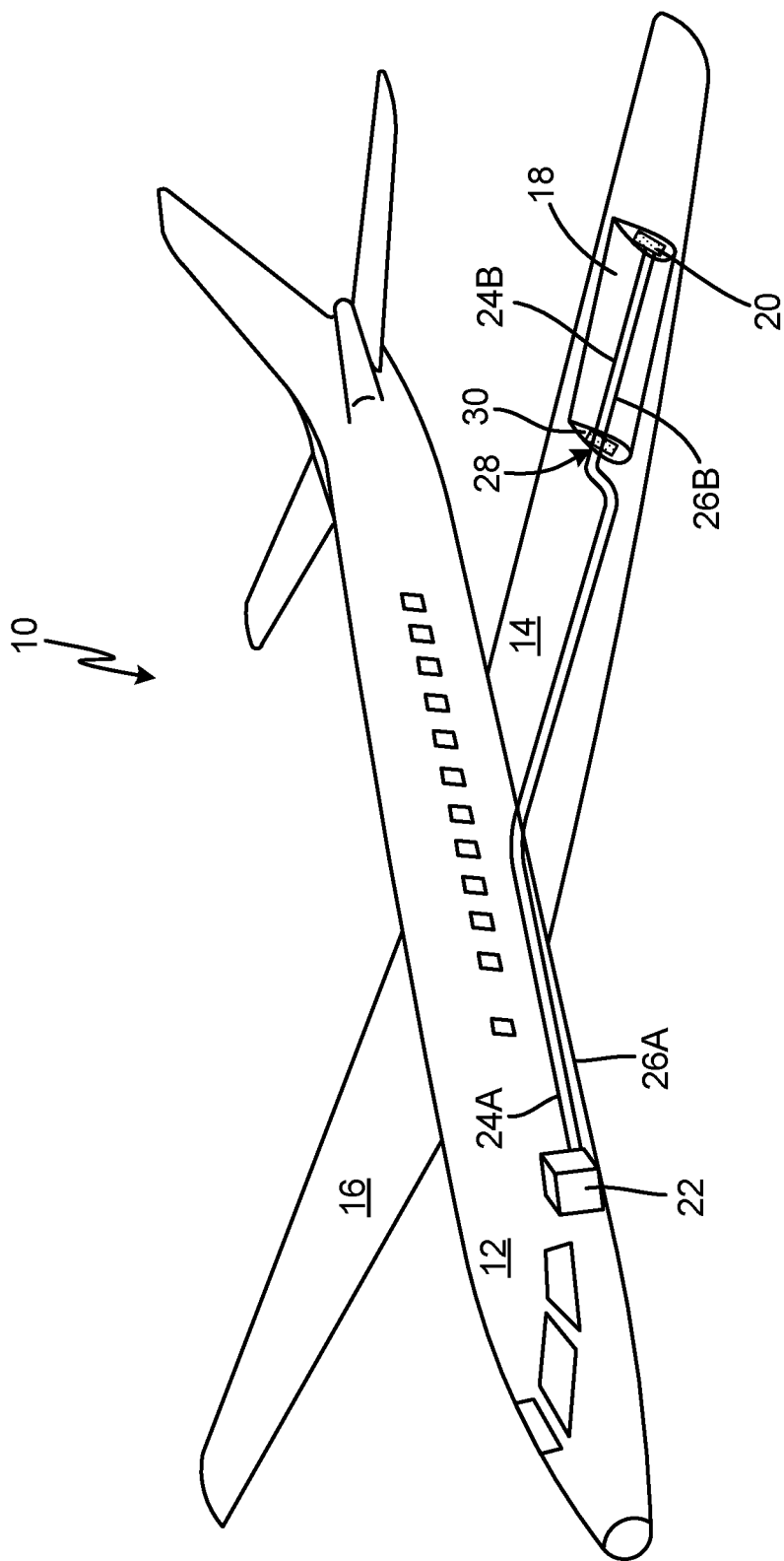
FIG. 1 is a schematic view of an aircraft equipped with an optically-powered fuel-level sensor and a sensor interface system.

FIG. 1 is a schematic view of an aircraft equipped with an optically-powered fuel-level sensor and a sensor interface system. In FIG. 1, aircraft 10 has fuselage 12 and wings 14 and 16. Wing 14 is equipped with internal fuel tank 18. Fuel-level sensor 20 is interiorly located within fuel tank 18. Fuel-level sensor 20 is an optically-powered fuel-level sensor. Fuel-level sensor 20 is in bidirectional optical communication with sensor interface system 22, which is located exterior to fuel tank 18. Bidirectional optical communication between fuel-level sensor 20 and sensor interface system 22 is conducted via optical fibers 24A, 24B, 26A and 26B. Optical fibers 24A and 24B provide an optical power communication path from sensor interface system 22 to optically-powered fuel-level sensor 20. Optical fibers 26A and 26B provide an optical communication path from optically-powered fuel-level sensor 20 to sensor interface system 22. Optical feedthrough 28 provides optical communication through vessel wall 30 of fuel tank 18, while maintaining seal integrity of fuel tank 18.

Sensor interface system 22 generates a beam of optical energy configured to provide operating power for optically-powered fuel-level sensor 20. Sensor interface system 22 provides the generated beam of optical energy to optical fiber 24A. Optical fiber 24A guides the beam of optical energy to optical feedthrough 28, through which the beam of optical energy traverses vessel wall 30. From optical feedthrough 28, the beam of optical energy is further guided to optically-powered fuel-level sensor 20 via optical fiber 24B. Optically-powered fuel-level sensor 20 receives the beam of optical energy and converts the beam of optical energy to electrical operating power for optically-powered fuel-level sensor 20. Optically-powered fuel-level sensor 20 senses the fuel level within fuel tank 18 and generates an optical signal indicative of the sensed fuel level. Optically-powered fuel-level sensor 20 then provides the generated signal indicative of the sensed fuel level to optical fiber 26B. Optical fiber 26B guides the signal indicative of the sensed fuel level to optical feedthrough 28, through which the signal indicative of the sensed fuel level traverses vessel wall 30. From optical feedthrough 28, the signal indicative of the sensed fuel level is further guided to sensor interface system 22 via optical fiber 26A. Thus, optical feedthrough 28 provides bidirectional optical communication through vessel wall 30.

Optical feedthrough 28 can also be configured to reflect a portion of the beam of optical energy generated by sensor interface system 22 and conducted by optical fiber 24A. The reflected portion of the beam of optical energy can be directed to optical fiber 26A, thereby adding to the signal indicative of the sensed fuel level guided therein. Along with the signal indicative of the sensed fuel level, the reflected portion of the optical energy is then guided from optical feedthrough 28 to sensor interface system 22. The signal indicative of the sensed fuel level can be coded via pulse coding, frequency coding, or phase coding, for example, thereby using various frequency components to indicate the sensed fuel level.

The reflected portion of the beam of optical energy, however, has the same frequency components as the generated beam of optical energy. The generated beam of optical energy is typically a low-frequency signal or even a DC signal. Because the frequency components of the signal indicative of the sensed fuel level and the reflected portion of the beam of optical energy are different from one another, sensor interface system 22 can distinguish between them. Sensor interface system 22 can, for example, determine the relative magnitude of the reflected portion of the beam of optical energy, with respect to a magnitude of the generated beam of optical energy. Sensor interface system 22 can then control a magnitude of the generated beam of optical energy based on the determined relative magnitude of the reflected portion of the beam of optical energy. Sensor interface system 22 can control the magnitude of the generated beam of optical energy so as to ensure that a non-reflected portion of the beam of optical energy entering the fuel tank is substantially equal to or less than a predetermined level. That is, sensor interface system 22 can ensure that the magnitude of the non-reflected portion of the beam of optical energy transmitted into fuel tank 18 is at a safe level, to prevent potential ignition of a flammable mixture in fuel tank 18.

Figure 2:
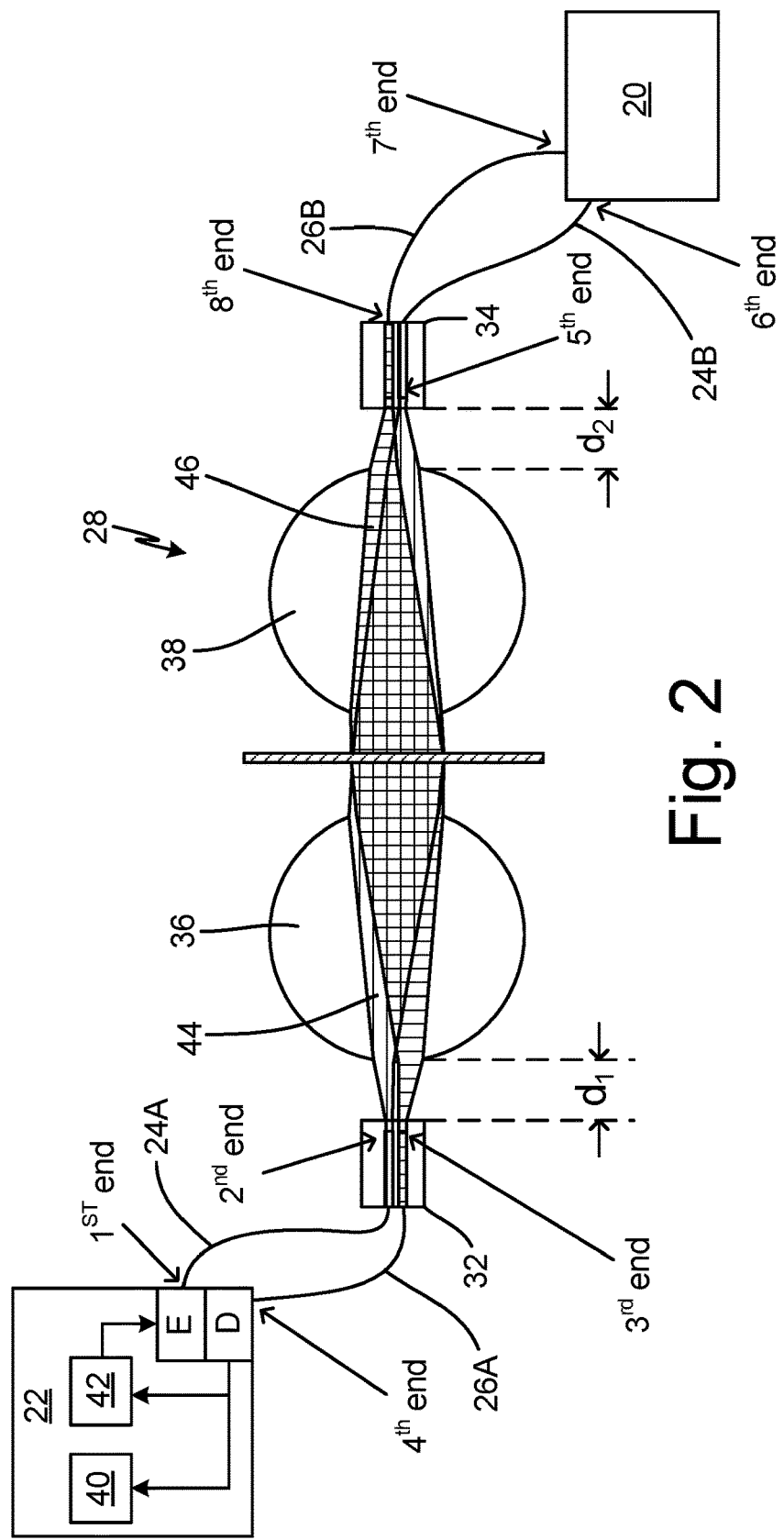
FIG. 2 is a schematic view of an embodiment of an optical feedthrough for providing optical signals across a sealed barrier to an interior of a fluid vessel.

FIG. 2 is a schematic view of an embodiment of an optical feedthrough for providing optical signals across a vessel wall to an interior of a fluid vessel. In FIG. 2, optical interface system 22 and optically-powered sensor 20 are optically coupled to optical feedthrough 38 via optical fibers 24A, 24B, 26A, and 26B. Optical interface system 22 is configured to generate a beam of optical energy, which provides operating power to optically-powered sensor 20. The generated beam of optical energy is transmitted from optical interface system 22 to optically-powered sensor 20 via an optical path that includes optical fiber 24A, optical feedthrough 38, and optical fiber 24B. Optical feedthrough is configured to provide optical communication through a mechanical barrier, such as, for example, a vessel wall. Optical feedthrough is further configured to reflect a portion of the beam of optical energy transmitted by optical fiber 24A and direct the reflected portion so that it is transmitted back to optical interface system via optical fiber 26A.

Optically-powered sensor 20 is configured to receive the beam of optical energy, to convert the received beam of optical energy into electrical operating power, to sense a physical parameter, to generate the time sequence of optical pulses indicative of the sensed physical parameter. The generated sequence of optical pulses is transmitted from optically-powered sensor 20 to optical interface system 22 via an optical path that includes optical fiber 26B, optical feedthrough 38, and optical fiber 26A.

Sensor interface system 22 includes optical emitter E, optical detector D, parameter extractor 40, and power controller 42. Optical emitter E is configured to emit a beam of optical energy so as to provide operating power for optically-powered sensor 20. The emitted beam of optical energy is received by a first end of optical fiber 24A, guided by optical fiber 24A, and projected from a second end of optical fiber 24A to optical feedthrough 38. Optical feedthrough 38 then transmits a portion of the beam of optical energy across the mechanical barrier and reflects a portion of the beam of optical energy so as to be detected by optical interface system 22. The transmitted portion of the beam of optical energy is received by a fifth end of optical fiber 24B, guided by optical fiber 24B, and projected from a sixth end of optical fiber 24B to optically-powered sensor 20.

The time sequence of optical pulses generated by optically-powered sensor 20 is received by a seventh end of optical fiber 26B, guided by optical fiber 26B, and projected from an eighth end of optical fiber 26B to optical feedthrough 38. Optical feedthrough 38 then transmits a time sequence of optical pulses across the mechanical barrier. The transmitted time sequence of optical pulses is received by a third end of optical fiber 26A, guided by optical fiber 26A, and projected from a fourth end of optical fiber 26A to optical detector D of optical interface system 22. Optical fiber 26A also guides the portion of the beam of optical energy reflected by optical feedthrough 38. Optical feedthrough 38 reflects the portion of the beam of optical energy so as to be received by the third end of optical fiber 26A. Optical fiber 26A then guides the received reflected portion of the beam of optical energy, and projects the received reflected portion of the beam of optical energy from the fourth end of optical fiber 26A.

Optical detector D is configured to detect a time sequence of optical pulses generated by optically-powered sensor 20 as well as the portion of the beam of optical energy reflected by optical feedthrough 38. The time sequence of optical pulses is projected from a third end of optical fiber 26A, guided by optical fiber 26A, and projected from a fourth end optical fiber 26A to optical detector D of optical interface system 22. The time sequence of pulses is modulated between a first optical power level and a second optical power level. Parameter extractor 40 is configured to determine a value of a sensed parameter based on the time sequence of optical pulses detected by the optical detector D. Power controller 42 is configured to control power level of the emitted beam of optical energy based on the first and/or second optical power levels detected by the optical detector.

Optical feedthrough 28 includes ferrules 32 and 34 and ball lenses 36 and 38. Ferrule 32 is coupled to the second end of optical fiber 24A and the third end of optical fiber 26A. Ferrule 34 is coupled to a fifth end of optical fiber 24B and an eighth end of optical fiber 26B. The second and third ends are aligned to be approximately parallel to one another and with each of second and third ends being located at approximately the same distance $d_1$ from ball lens 36. Similarly, fifth and eighth ends are aligned to be substantially parallel to one another and with each of fifth and eighth ends being at substantially the same distance $d_2$ from ball lens 38. The second and third ends are approximately parallel to one another (and fifth and eighth end are approximately parallel to one another) if an angle between them is less than five degrees. The second and third ends are approximately the same distance $d_1$ from ball lens 36 (and fifth and eighth ends are approximately the same distance $d_2$ from ball lens 38) if the difference in distance is within 5 percent of a nominal distance.

Ball lens 36 is configured to collimate beam 44 of optical energy so as to traverse in a collimated fashion an optically transparent or translucent section of vessel wall 30. Similarly, ball lens 38 is configured to collimate signal 46 indicative of sensed fuel level so as to traverse in a collimated fashion an optically transparent or translucent section of vessel wall 30. Ball lens 38 also focuses collimated beam 44 of optical energy onto end 40B of optical fiber 24B so that optical fiber 24B can guide beam 46 of optical energy to sensor 20. Similarly, ball lens 36 focuses collimated signal 46 indicative of the sensed fuel level onto end 42A of optical fiber 26A so that optical fiber 26A can guide signal 46 indicative of the sensed fuel level to sensor interface system 22. Ball lenses 36 and 38 can be coated with anti-reflection coatings, so as to control the portion of optical signals incident thereupon that is reflected thereby or transmitted therethrough. For example, an optical coating can be applied having a specification that ten percent of the incident optical energy is reflected and ninety percent of the incident energy is transmitted. The exterior surface of each of ball lenses 36 and 38 is convex. Therefore, the reflected portion of the generated beam of optical energy will diverge. Of the ten percent of the incident energy that is reflected, some of the reflected portion will be transmitted into fiber 26A via end 42A while the non-reflected portion will be transmitted into fiber 24B via end 40B. The portion that is transmitted into end 42A will be guided from optical feedthrough 28 to sensor interface system 22 via optical fiber 26A. The portion that is transmitted into end 40B will be guided from optical feedthrough 28 to optically-powered sensor 20 via optical fiber 24B.

Figure 3:
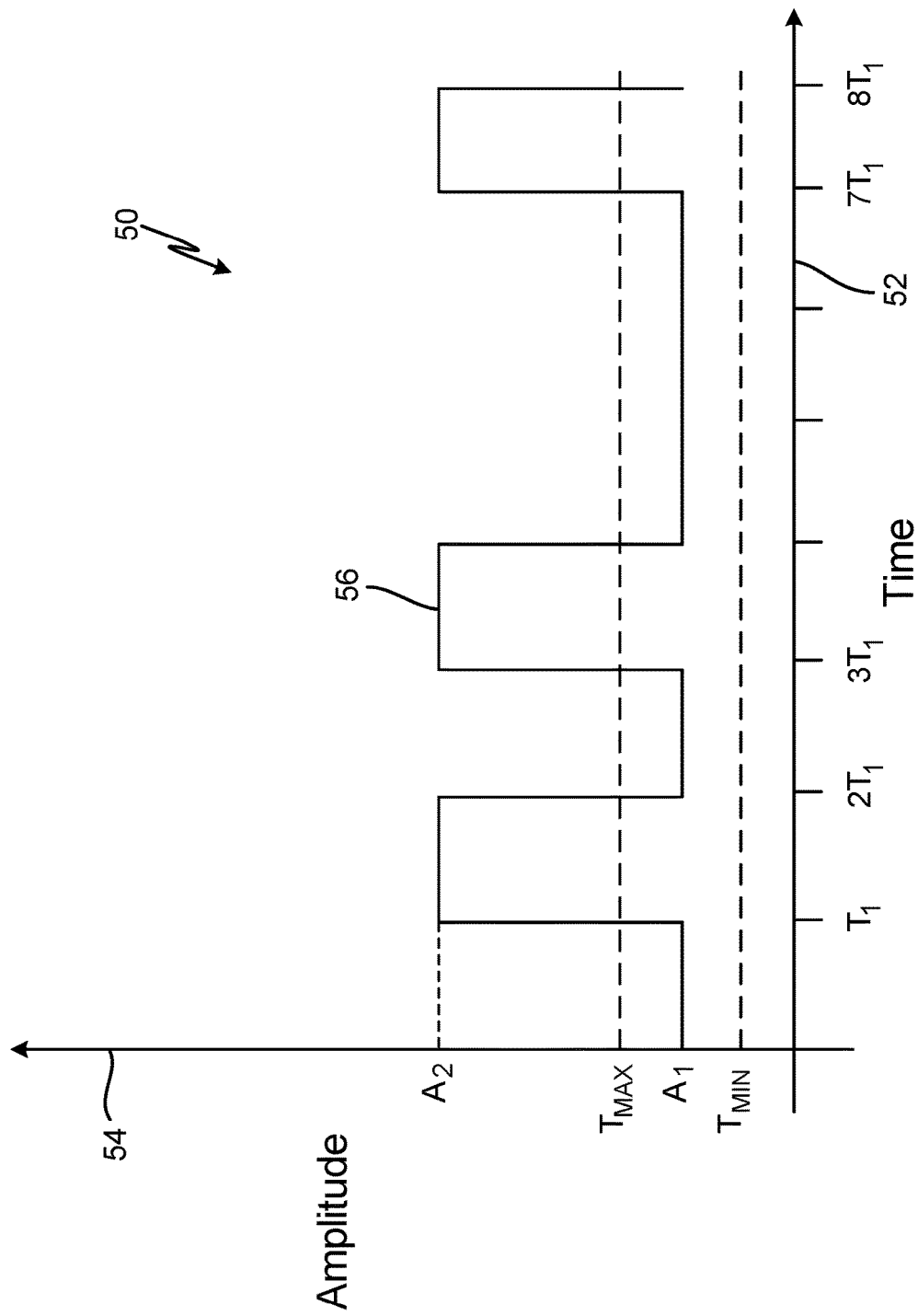
FIG. 3 is a graph of an optical signal provided to a sensor interface system for an optically-powered fuel-level sensor.

FIG. 3 is a graph of an optical signal provided to a sensor interface system for optically-powered fuel-level sensor 20. In FIG. 3, graph 50 has horizontal axis 52 and vertical axis 54. Horizontal axis 52 is indicative of time, and vertical axis 54 is indicative of signal magnitude, or optical power level. Graph 50 also has relation 56 depicting an exemplary optical signal guided by optical fiber 26A and received by sensor interface system 22. Relation 56 depicts an optical signal that includes both the signal indicative of the sensed fuel level and the reflected portion of the beam of optical energy. In relation 56 depicted in FIG. 3, the reflected portion of the beam of optical energy is indicated by baseline level or DC offset Al of relation 56, which is the signal indicative of the sensed fuel level. As a result of the addition of the reflected portion of the beam of optical energy to the signal indicative of the sensed fuel level, the depicted pulse train varies between first amplitude $A_1$ and second amplitude $A_2$ greater than the first amplitude $A_1$. The first amplitude $A_1$ is indicative of the reflected portion of the beam of optical energy, and the time variation of the pulse train is indicative of the sensed fuel level. Sensor interface system 22 (depicted in FIG. 1) can determine the magnitude of the reflected portion of the beam of optical energy by determining the first amplitude $A_1$ or base amplitude of the pulse stream. Sensor interface system 22 can determine the sensed fuel level by decoding the pulse train indicated by relation 56.

In some embodiments, power controller 42 (depicted in FIG. 2) is configured to control the power of the emitted beam of optical energy based on first amplitude $A_1$. For example, in some embodiments, power controller 42 will compare first amplitude $A_1$ with predetermined threshold $T_{MAX}$ indicative of a maximum power level. If first amplitude $A_1$ is greater than predetermined threshold $T_{MAX}$, then power controller 42 will cause the power of the emitted beam of optical energy to be reduced. In some embodiments, power controller 42 will also compare first amplitude $A_1$ with predetermined threshold $T_{MIN}$ indicative of a minimum power level. Such control can be used to ensure that the emitted beam of optical energy provides sufficient operating power to optically-powered sensor 20.

Figure 4:
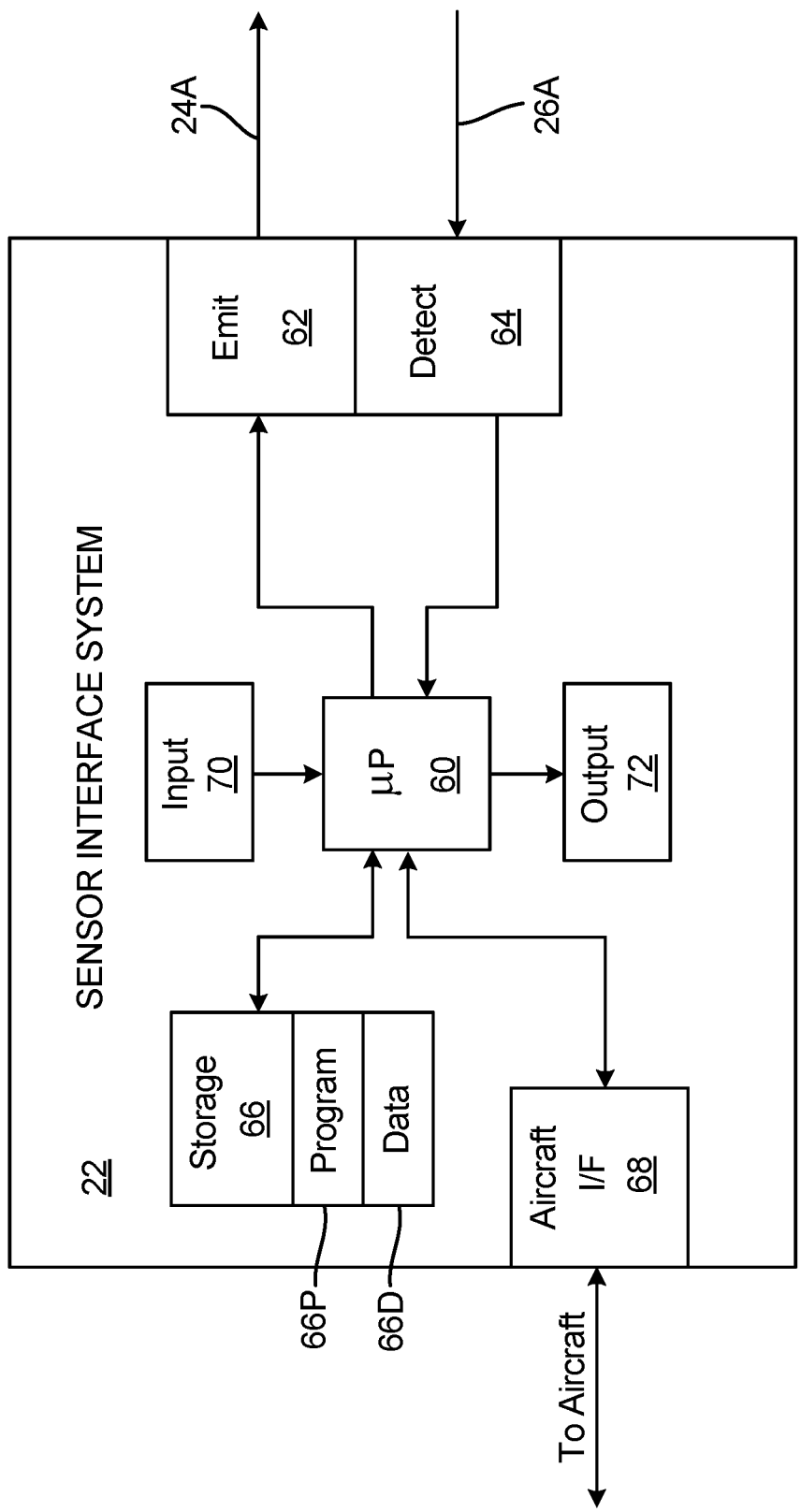
FIG. 4 is a block diagram of an embodiment of a sensor interface system for an optically-powered fuel-level sensor.

FIG. 4 is a block diagram of an embodiment of a sensor interface system for an optically-powered fuel-level sensor. In FIG. 4, sensor interface system 22 includes processor(s) 60, optical emitter 62, optical detector 64, storage device(s) 66, aircraft interface 68, input devices 70 and output devices 72. Processor(s) 60 can receive program instructions 66P from storage device(s) 66. Processor(s) 60 can be configured to control sensor interface system 22, based on received program instructions 66P. For example processor(s) 60 can be configured to cause optical emitter 62 to generate a beam of light having sufficient energy to provide operating power to a remote optically-powered fuel-level sensor. The generated beam of light energy is directed into optical fiber 24A guides it along a path to the remote optically-powered fuel-level sensor. The remote optically-powered fuel-level sensor can be configured to generate an optical signal indicative of a sensed parameter, and transmit the generated signal back to sensor interface system 22 via optical fiber 26A.

Optical emitter 62 can generate the beam of optical energy guided by optical fiber 24A along the path to the remote optically-powered fuel-level sensor. An optical feedthrough can be located at the vessel wall to provide optically transmission of the generated beam of optical energy across the vessel wall. The optical feedthrough can also reflect a portion of the generated beam of optical energy and direct the reflected portion back to sensor interface system 22 as a metric of the energy of the generated beam at the vessel wall location. The reflected portion can be directed to optical fiber 26A, which is configured to guide optical energy to sensor interface system 22. Thus, optical fiber 26A can guide both the optical signal indicative of the sensed parameter and the reflected portion of light energy configured to provide operating power to the remote optically-powered fuel-level sensor. Optical emitter 62 can, for example, be a laser diode, or a light emitting diode (LED), or any other type of light generating device.

Optical detector 64 is configured to detect both the optical signal indicative of the sensed parameter and the reflected portion of light energy configured to provide operating power to the remote optically-powered fuel-level sensor. Optical detector 64 is configured to generate an electrical signal indicative of the detected optical light guided by optical fiber 26A, and to provide the electrical signal to processor(s) 60. Optical detector 64 can be a photo resistor, a photo diode, a phototransistor, or any other type of photo detector.

Processor(s) 60 receives, from optical detector 64, the electrical signal indicative of the optical light detected. The electrical signal will include indicia of both the optical signal indicative of the sensed parameter and the reflected portion of light energy configured to provide operating power to the remote optically-powered fuel-level sensor. Processor(s) 60 can then be programmed to determine, based on such indicia, metrics of the light energy of the generated beam and the sensed parameter. Processor(s) 60 can then control the light energy of the beam generated by optical emitter 62 based on the metric of light energy of the generated beam. For example, processor(s) 60 can compare the metric of light energy with a predetermined threshold. If, for example, the metric of light energy is greater than the predetermined threshold, processor(s) 60 might provide a control signal to optical emitter 62 that causes optical emitter 62 to reduce the light energy of the generated beam. Conversely, if the metric of light energy is less than the predetermined threshold, processor(s) 60 might provide a control signal to optical emitter 62 that causes optical emitter 62 to increase the light energy of the generated beam.

Processor(s) 60 can store the metric of light energy in memory, so as to provide a record of the light energy of the generated beam. Processor(s) 60 can also generate an alert signal and send the generated alert signal to aircraft interface 68, if processor(s) 60 detect a failure based on the electrical signal indicative of the detected optical light guided by optical fiber 26A. In some embodiments, processor(s) 60 can store and/or log the associated parameter values in data memory 66D. In some embodiments, processor(s) 60 may interface with other input and output devices 70 and 72.

As illustrated in FIG. 4, sensor interface system 22 includes processor(s) 60, optical emitter 62, optical detector 64, storage device(s) 66, aircraft interface 68, user input devices 70, and user output devices 72. However, in certain examples, sensor interface system 22 can include more or fewer components. For instance, in examples where sensor interface system 22 is an avionics unit, controller 14 may not include user input devices 70 and/or user output devices 72. In some examples, such as where sensor interface system 22 is a mobile or portable device such as a laptop computer, sensor interface system 22 may include additional components such as a battery that provides power to components of controller 14 during operation.

Processor(s) 60, in one example, is configured to implement functionality and/or process instructions for execution within sensor interface system 22. For instance, processor(s) 60 can be capable of processing instructions stored in storage device(s) 66. Examples of processor(s) 60 can include any one or more of a microprocessor, a controller, a digital signal processor(s) (DSP), an application specific integrated circuit (ASIC), a field-programmable gate array (FPGA), or other equivalent discrete or integrated logic circuitry.

Storage device(s) 66 can be configured to store information within sensor interface system 22 during operation. Storage device(s) 66, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 66 is a temporary memory, meaning that a primary purpose of storage device(s) 66 is not long-term storage. Storage device(s) 66, in some examples, is described as volatile memory, meaning that storage device(s) 66 do not maintain stored contents when power to sensor interface system 22 is turned off. Examples of volatile memories can include random access memories (RAM), dynamic random access memories (DRAM), static random access memories (SRAM), and other forms of volatile memories. In some examples, storage device(s) 66 is used to store program instructions for execution by processor(s) 60. Storage device(s) 66, in one example, is used by software or applications running on sensor interface system 22 (e.g., a software program implementing long-range cloud conditions detection) to temporarily store information during program execution.

Storage device(s) 66, in some examples, can also include one or more computer-readable storage media. Storage device(s) 66 can be configured to store larger amounts of information than volatile memory. Storage device(s) 66 can further be configured for long-term storage of information. In some examples, storage device(s) 66 include non-volatile storage elements. Examples of such non-volatile storage elements can include magnetic hard discs, optical discs, flash memories, or forms of electrically programmable memories (EPROM) or electrically erasable and programmable (EEPROM) memories.

Aircraft interface 68 can be used to communicate information between sensor interface system 22 and an aircraft. In some embodiments, such information can include aircraft conditions, flying conditions, and/or atmospheric conditions. In some embodiments, such information can include data processed by sensor interface system 22, such as, for example, alert signals. Aircraft interface 68 can also include a communications module. Aircraft interface 68, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi 33 radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

User input devices 70, in some examples, are configured to receive input from a user. Examples of user input devices 70 can include a mouse, a keyboard, a microphone, a camera device, a presence-sensitive and/or touch-sensitive display, push buttons, arrow keys, or other type of device configured to receive input from a user. In some embodiments, input communication from the user can be performed via a communications bus, such as, for example, an Aeronautical Radio, Incorporated (ARINC) standard communications protocol. In an exemplary embodiment, user input communication from the user can be performed via a communications bus, such as, for example, a Controller Area Network (CAN) bus.

User output devices 72 can be configured to provide output to a user. Examples of user output devices 72 can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines. In some embodiments, output communication to the user can be performed via a communications bus, such as, for example, an Aeronautical Radio, Incorporated (ARINC) standard communications protocol. In an exemplary embodiment, output communication to the user can be performed via a communications bus, such as, for example, a Controller Area Network (CAN) bus.

Discussion of Possible Embodiments

The following are non-exclusive descriptions of possible embodiments of the present invention.

Apparatus and associated methods relate to a system for interfacing with an optically-powered sensor. The system includes an optical emitter configured to emit a beam of optical energy so as to provide operating power for the optically-powered sensor. The system includes an optical detector configured to detect a time sequence of optical pulses generated by the optically-powered sensor, the time sequence of pulses modulated between first and second optical power levels. The system includes a parameter extractor configured to determine a value of a sensed parameter based on the time sequence of optical pulses detected by the optical detector. The system also includes a power controller configured to control power level of the emitted beam of optical energy based on the first and/or second optical power levels detected by the optical detector.

The system of the preceding paragraph can optionally include, additionally and/or alternatively, any one or more of the following features, configurations and/or additional components:

A further embodiment of the foregoing system, wherein the first optical power level can be a baseline level or DC offset of the time sequence of optical pulses, and the power controller can be further configured to control the power level of the emitted beam such that the detected baseline level or DC offset is less than or equal to a predetermined threshold.

A further embodiment of any of the foregoing systems can further include a first optical fiber having first and second ends, the optical fiber configured to receive, at the first end, the emitted beam of optical energy, to transmit the received beam of optical energy to the second end, and to project the transmitted beam of optical energy from the second end.

A further embodiment of any of the foregoing systems can further include a second optical fiber having third and fourth ends, the second optical fiber configured to receive, at the third end, the time sequence of optical pulses, to transmit the received time sequence of optical pulses to the fourth end, and to project the transmitted time sequence of optical pulses from the fourth end, so as to be received by the optical detector.

A further embodiment of any of the foregoing systems can further include an optical feedthrough configured to provide optical communication both between the second end and the optically-powered sensor so as to transmit the beam of optical energy to the optically-powered sensor, and between the third end and the optically-powered sensor, so as to receive the time sequence of optical pulses from the optically-powered sensor.

A further embodiment of any of the foregoing systems, wherein the optical feedthrough can include first and second fiber junctions.

A further embodiment of any of the foregoing systems, wherein, the optical feedthrough can be further configured to reflect a portion of the beam of optical energy projected from the second end so as to be received at the third end, wherein the second optical fiber is further configured to transmit the received portion of the beam reflected by the fiber junction to the fourth end, and to project the transmitted portion of the beam reflected by the fiber junction from the fourth end.

A further embodiment of any of the foregoing systems can further include a lens configured to reflect the portion of the beam of optical energy projected from the second end of the first optical fiber so as to be received by the third end of the second optical fiber, the lens further configured to collimate and transmit a complementary non-reflected portion of the beam of optical energy therethrough.

A further embodiment of any of the foregoing systems, wherein the lens can be a ball lens.

A further embodiment of any of the foregoing systems can further include a fiber ferrule coupled to both the second end of the first optical fiber and the third end of the second optical fiber, wherein the second and third ends are adjacent to one another and aligned in a substantially parallel fashion to one another, so that a first direction of the projected beam of optically energy is substantially anti-parallel to a second direction of the received optical signal.

A further embodiment of any of the foregoing systems can further include a keyed ferrule coupler, wherein the fiber ferrule can have a key so as to rotationally align the second and third ends with the keyed ferrule coupler.

A further embodiment of any of the foregoing systems can further include the optically-powered sensor configured to receive the beam of optical energy, to convert the received beam of optical energy into electrical operating power, to sense a physical parameter, to generate the time sequence of optical pulses indicative of the sensed physical parameter, and to transmit the generated time sequence of optical pulses.

Some embodiments relate to a method for interfacing with an optically-powered sensor, the method includes emitting, by an optical emitter, a beam of optical energy so as to provide operating power for the optically-powered sensor. The method includes detecting, by an optical detector, a time sequence of optical pulses modulated between first and second optical power levels. The method includes determining, by a parameter extractor, a value of a sensed parameter based on the time sequence of optical pulses detected by the optical detector. The method also includes controlling, by a power controller, power level of the emitted beam of optical energy based on the first and/or second optical power levels detected by the optical detector.

The method of the preceding paragraph can optionally include, additionally and/or alternatively, any one or more of the following features, configurations and/or additional components:

A further embodiment of the foregoing method can further include receiving, at a first end of a first optical fiber, the emitted beam of optical energy. The method can further include transmitting the received beam of optical energy to a second end of the first optical fiber. The method can also include projecting the transmitted beam of optical energy from the second end.

A further embodiment of any of the foregoing methods can further include receiving, at the third end of a second optical fiber, the time sequence of optical pulses. The method can further include transmitting the received time sequence of optical pulses to a fourth end of the second optical fiber. The method can also include projecting the transmitted time sequence of optical pulses from the fourth end, so as to be received by the optical detector.

A further embodiment of any of the foregoing methods can further include providing, by an optical feedthrough, optical communication both between the second end and the optically-powered sensor, so as to transmit the beam of optical energy to the optically-powered sensor, and between the third end and the optically-powered sensor, so as to receive the time sequence of optical pulses from the optically-powered sensor.

A further embodiment of any of the foregoing methods can further include reflecting, by the optical feedthrough, a portion of the beam of optical energy projected from the second end so as to be received at the third end. The method can further include transmitting, by the second optical fiber, the received portion of the beam reflected by the fiber junction to the fourth end. The method can also include projecting the transmitted portion of the beam reflected by the fiber junction from the fourth end.

A further embodiment of any of the foregoing methods can further include reflecting, by a lens, the portion of the beam of optical energy projected from the second end of the first optical fiber so as to be received by the third end of the second optical fiber. The method can also include collimating and transmitting, by the lens, a complementary non-reflected portion of the beam of optical energy therethrough.

A further embodiment of any of the foregoing methods can further include aligning, by a ferrule, the second end of the first optical fiber and the third end of the second optical fiber in a substantially parallel fashion to one another, so that a first direction of the projected beam of optically energy is substantially anti-parallel to a second direction of the received optical signal.

A further embodiment of any of the foregoing methods can further include rotationally aligning, by a key, the second and third ends with the optical feedthrough.

A further embodiment of any of the foregoing methods can further include receiving, by the optically-powered sensor, the beam of optical energy. The method can further include converting, by the optically-powered sensor, the received beam of optical energy into electrical operating power. The method can further include sensing, by the optically-powered sensor, a physical parameter. The method can further include generating, by the optically-powered sensor, the time sequence of optical pulses indicative of the sensed physical parameter.

The method can also include transmitting, by the optically-powered sensor, the generated time sequence of optical pulses.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for interfacing with an optically-powered sensor, the system comprising:
   an optical emitter configured to emit a beam of optical energy so as to provide operating power for the optically-powered sensor;
   an optical detector configured to detect a time sequence of optical pulses generated by the optically-powered sensor, the time sequence of pulses modulated between first and second optical power levels;
   a parameter extractor configured to determine a value of a sensed parameter based on the time sequence of optical pulses detected by the optical detector; and
   a power controller configured to control power level of the emitted beam of optical energy based on the first and/or second optical power levels detected by the optical detector.

2. The system of claim 1, wherein the first optical power level is a baseline level or DC offset of the time sequence of optical pulses, and the power controller is further configured to control the power level of the emitted beam such that the detected baseline level or DC offset is less than or equal to a predetermined threshold selected to prevent potential ignition of a flammable mixture in a tank into which the beam of optical energy is transmitted.

3. The system of claim 1, further comprising:
   a first optical fiber having first and second ends, the optical fiber configured to receive, at the first end, the emitted beam of optical energy, to transmit the received beam of optical energy to the second end, and to project the transmitted beam of optical energy from the second end; and
   a second optical fiber having third and fourth ends, the second optical fiber configured to receive, at the third end, the time sequence of optical pulses, to transmit the received time sequence of optical pulses to the fourth end, and to project the transmitted time sequence of optical pulses from the fourth end, so as to be received by the optical detector.

4. The system of claim 3, further comprising:
   an optical feedthrough configured to provide optical communication both between the second end and the optically-powered sensor so as to transmit the beam of optical energy to the optically-powered sensor, and between the third end and the optically-powered sensor, so as to receive the time sequence of optical pulses from the optically-powered sensor.

5. The system of claim 4, wherein the optical feedthrough includes first and second fiber junctions.

6. The system of claim 4, wherein, the optical feedthrough is further configured to reflect a portion of the beam of optical energy projected from the second end so as to be received at the third end, wherein the second optical fiber is further configured to transmit the received portion of the beam reflected by the fiber junction to the fourth end, and to project the transmitted portion of the beam reflected by the fiber junction from the fourth end.

7. The system of claim 6, wherein the optical feedthrough further includes:
   a lens configured to reflect the portion of the beam of optical energy projected from the second end of the first optical fiber so as to be received by the third end of the second optical fiber, the lens further configured to collimate and transmit a complementary non-reflected portion of the beam of optical energy therethrough.

8. The system of claim 7, wherein the lens is a ball lens.

9. The system of claim 4, further comprising:
a fiber ferrule coupled to both the second end of the first optical fiber and the third end of the second optical fiber, wherein the second and third ends are adjacent to one another and aligned in a substantially parallel fashion to one another, so that a first direction of the projected beam of optically energy is substantially anti-parallel to a second direction of the received optical signal.

10. The system of claim 9, wherein the optical feedthrough includes:
a keyed ferrule coupler, wherein the fiber ferrule has a key so as to rotationally align the second and third ends with the keyed ferrule coupler.

11. The system of claim 4, further comprising:
the optically-powered sensor configured to receive the beam of optical energy, to convert the received beam of optical energy into electrical operating power, to sense a physical parameter, to generate the time sequence of optical pulses indicative of the sensed physical parameter, and to transmit the generated time sequence of optical pulses.

12. A method for interfacing with an optically-powered sensor, the method comprising:
emitting, by an optical emitter, a beam of optical energy so as to provide operating power for the optically-powered sensor;
detecting, by an optical detector, a time sequence of optical pulses modulated between first and second optical power levels;
determining, by a parameter extractor, a value of a sensed parameter based on the time sequence of optical pulses detected by the optical detector; and
controlling, by a power controller, power level of the emitted beam of optical energy based on the first and/or second optical power levels detected by the optical detector.

13. The method of claim 12, further comprising:
receiving, at a first end of a first optical fiber, the emitted beam of optical energy;
transmitting the received beam of optical energy to a second end of the first optical fiber; and
projecting the transmitted beam of optical energy from the second end.

14. The method of claim 12, further comprising:
receiving, at the third end of a second optical fiber, the time sequence of optical pulses;
transmitting the received time sequence of optical pulses to a fourth end of the second optical fiber; and
projecting the transmitted time sequence of optical pulses from the fourth end, so as to be received by the optical detector.

15. The method of claim 13, further comprising:
providing, by an optical feedthrough, optical communication both between the second end and the optically-powered sensor, so as to transmit the beam of optical energy to the optically-powered sensor, and between the third end and the optically-powered sensor, so as to receive the time sequence of optical pulses from the optically-powered sensor.

16. The method of claim 14, further comprising:
reflecting, by the optical feedthrough, a portion of the beam of optical energy projected from the second end so as to be received at the third end;
transmitting, by the second optical fiber, the received portion of the beam reflected by the fiber junction to the fourth end; and
projecting the transmitted portion of the beam reflected by the fiber junction from the fourth end.

17. The method of claim 16, further comprising:
reflecting, by a lens, the portion of the beam of optical energy projected from the second end of the first optical fiber so as to be received by the third end of the second optical fiber; and
collimating and transmitting, by the lens, a complementary non-reflected portion of the beam of optical energy therethrough.

18. The method of claim 14, further comprising:
aligning, by a ferrule, the second end of the first optical fiber and the third end of the second optical fiber in a substantially parallel fashion to one another, so that a first direction of the projected beam of optically energy is substantially anti-parallel to a second direction of the received optical signal.

19. The method of claim 18, further comprising:
rotationally aligning, by a key, the second and third ends with the optical feedthrough.

20. The method of claim 14, further comprising:
receiving, by the optically-powered sensor, the beam of optical energy;
converting, by the optically-powered sensor, the received beam of optical energy into electrical operating power;
sensing, by the optically-powered sensor, a physical parameter;
generating, by the optically-powered sensor, the time sequence of optical pulses indicative of the sensed physical parameter; and
transmitting, by the optically-powered sensor, the generated time sequence of optical pulses.

* * * * *